United States Patent [19]

Longenecker

[11] 4,241,648
[45] Dec. 30, 1980

[54] APPARATUS FOR SHAPING AND PRECOOKING OF TORTILLAS

[75] Inventor: John G. Longenecker, Ozone Park, N.Y.

[73] Assignee: Roberto G. Barrera, Monterrey, Mexico

[21] Appl. No.: 26,368

[22] Filed: Apr. 2, 1979

Related U.S. Application Data

[63] Continuation-in-part of Ser. No. 849,890, Nov. 9, 1977, abandoned.

[51] Int. Cl.³ .............................................. A21C 3/00
[52] U.S. Cl. ...................................... 99/349; 99/353; 99/355; 99/423; 99/443 C; 100/156; 100/210; 425/374
[58] Field of Search ............. 99/353, 423, 427, 443 C, 99/349, 355; 426/502, 496, 512, 513, 517, 497; 425/374, 363; 100/93 P, 93 RP, 156, 210

[56] References Cited

U.S. PATENT DOCUMENTS

| | | | |
|---|---|---|---|
| 1,509,730 | 9/1924 | Hughes | 100/210 UX |
| 2,812,729 | 11/1957 | Bahlsen | 99/423 X |
| 3,167,000 | 1/1965 | Sassen et al. | 99/441 X |
| 3,223,053 | 12/1965 | Jimenez et al. | 99/353 |
| 3,263,595 | 8/1966 | Bower | 99/349 |
| 3,397,655 | 8/1968 | Valadez et al. | 99/353 |
| 3,401,626 | 9/1968 | Amalfitano | 99/423 X |
| 3,427,372 | 2/1969 | Berner | 425/374 X |
| 3,829,593 | 8/1974 | Hui | 99/423 X |
| 4,197,792 | 4/1980 | Mendoza | 99/353 X |

FOREIGN PATENT DOCUMENTS

| | | | |
|---|---|---|---|
| 2301183 | 10/1976 | France | 99/423 |
| 350927 | 6/1931 | United Kingdom | 425/374 |

*Primary Examiner*—Marc L. Caroff
*Attorney, Agent, or Firm*—William G. Rhines

[57] ABSTRACT

Apparatus for processing compressible, heat settable material, and in one embodiment, useful in producing foodstuffs including so-called tortillas made from wheat flour, comprises a step-motion, rotatable, heated drum; a curved, pivotally-mounted, heated compression plate positioned in proximity to the drum for being swung into position parallel to the surface of said drum when the drum is in the stop-phase of step motion; feed means for feeding foodstuff materials into the region between the drum and the plate when the plate is swung away from the drum; and means for conveying compressed foodstuffs away from the drum surface as it rotates in the motion phase of the step motion.

10 Claims, 4 Drawing Figures

APPARATUS FOR SHAPING AND PRECOOKING OF TORTILLAS

CROSS REFERENCE TO RELATED APPLICATION

This Application is a Continuation-In-Part Application of Application Ser. No. 849,890, filed Nov. 9, 1977, now abandoned.

BACKGROUND OF THE INVENTION

This invention relates to machinery for processing compressible material, such as flour tortillas and other foodstuffs. Wheat flour tortillas, for example, present special problems in handling because of the physical characteristics of the materials from which they are formed and of the intermediate and end products. It is known that such products possess characteristics which make them difficult to process mechanically, and to partially surface cook the material from which they are made, being, as they are, resilient materials which tend to form into non-round configurations when flattened and to exhibit a "memory" for resuming a spherical configuration, in spite of the dough having been "tempered", i.e., allowed to rest to remove stresses which tend to make it resist being re-worked. In addition, as contrasted with corn dough tortillas, for example, wheat dough is a wetter, stickier material, presenting more difficult handling properties. In accordance with the teaching of the present invention, the effect of surface heating or cooking is to "set" the material so as to stabilize its shape in preparation for subsequent cooking operations, although, for a long time, these problems have tended to mandate against automating the process of manufacture of such materials.

Recently, there have been efforts to achieve such automation by the use of converging carrier belts, and by reciprocating, opposing, heated platens. In this connection, reference is made to U.S. Pat. No. 3,223,053 and U.S. Pat. No. 3,397,655. Such efforts, however, have not proved to be entirely satisfactory since they involve relatively complex and costly machinery, which does not permit production rates or uniformity of sufficiently high levels.

Accordingly, it is an object of the present invention to provide means for compression forming foodstuff materials.

It is another object of the present invention to provide such means that is structurally simple, reliable and inexpensive to build and operate.

Another object of this invention is to achieve the foregoing objectives in machinery particularly adapted for the processing of materials which desirably are surface heated during the compression phase.

Yet another object of the present invention is to achieve the foregoing objectives in equipment for processing foodstuffs such as wheat "flour" tortillas and the like.

SUMMARY OF THE INVENTION

Desired objectives may be achieved through practice of the present invention which, in one embodiment, comprises a curved, moveable, heated, forming base, and a correspondingly shaped, heated platen, pivotally mounted for reciprocal movement in proximity to the base, for compressing masses of deformable material therebetween. Other embodiments include such apparatus with means for causing the curved base to move in step motion, means for causing the platen to move into the "swung-closed" position at the stop-phase of the step motion, means for inserting masses of material to be processed into the region between the base and the platen when the latter is in the "swung-open" position, and means for causing compressed material to be removed from the surface of the moving base along a path that is substantially tangential to the curved surface of the base.

This invention may be understood from the description which follows, and from the attached drawings in which FIG. 1 depicts an embodiment of the present invention, FIG. 2 depicts the embodiment of this invention shown in FIG. 1 in another stage of operation, FIG. 3 depicts the embodiment of this invention shown in FIG. 1 in still another stage of operation, and FIG. 4 depicts the embodiment of this invention shown in FIG. 1 in yet another stage of operation.

DESCRIPTION OF PREFERRED EMBODIMENTS

Figure 1:
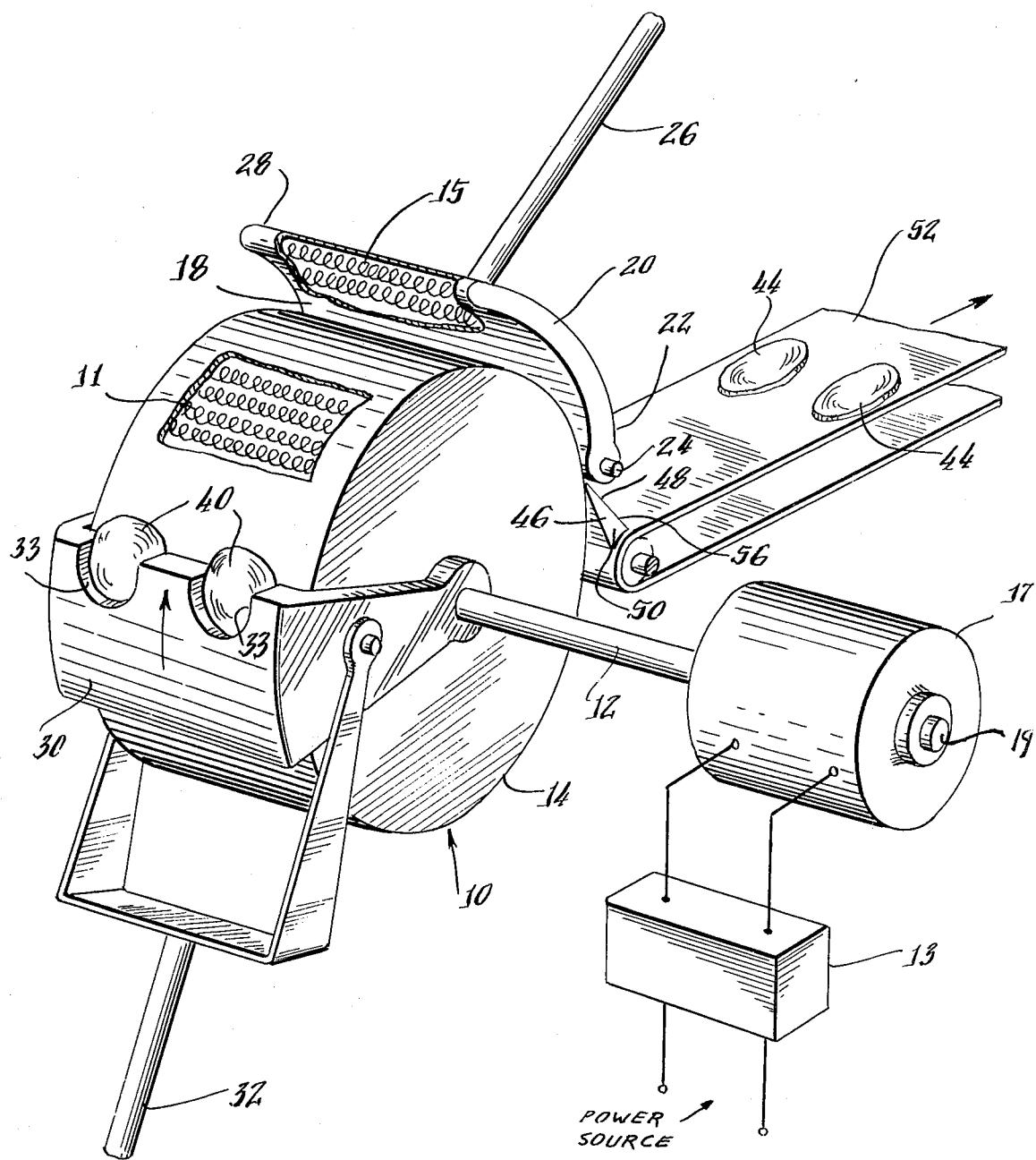

Referring first to FIG. 1, there is depicted an embodiment of this invention comprising a forming base in the form of a roll 10, which is free to rotate about a supporting axle 12 when driven by drive means. Such drive means may be in any of a wide variety of forms which are known per se. Thus, without intending thereby to be limited to that exact form, there is shown in FIG. 1 an extension of the supporting axle 12 which is connected to the output shaft 19 of a direct current motor 17; the latter being particularly adapted to achieve the "step" movement hereinafter described. For reasons which will be apparent from the description which follows, the roll drive means advantageously should be of such a nature as to cause the roll to revolve in "step" movement; i.e., alternatively starting and stopping so as to produce sequentially a "stopped phase", when the roll is not rotating, and a movement phase, when it is rotating. This kind of motion may be imparted by means of any of a wide variety of means, such as the timer 13 shown in FIG. 1, by means of which the motor 17 may be intermittently energized. The roll 10 may be heated internally by electric, gas, or other known per se means for the purpose of rendering the outer shell 14 hot enough to perform the desired heating or cooking operation on the footstuff material that is being processed in the apparatus, particularly in the processing region 18 between the shell 14 of the roll 10 and the compression plate platen 20. For purposes of illustration, the apparatus depicted in FIG. 1 is shown as having electrical resistance heating elements 11, although as noted above, other means for effecting such heating are within the contemplation of this disclosure. These structural elements, and the other hereinafter described, are also clearly shown in FIGS. 2-4.

The platen 20 is in the form of a curved plate that is pivotally mounted to the machine frame or other support structure (not shown) at one end 22 by means of a pintle pin 24 or other known per se structure. By this means, through operation of the connecting rod 26, the opposite end 28 of the platen 20 may be caused to move toward or away from the shell 14 of the roll 10. The platen 20 is also heated by gas, electricity, or other known per se means to perform a heating or cooking operation on the material being processed, comparable to that performed by the heating of the shell 14 of the roll 10 adacent to the region 18, such as elctrical resistance heating coil 15. As hereinafter described, the movement of the platen 20 toward and away from the roll 10 through operation of the connecting rod 26 may be made periodic, to coordinate the positioning of the platen with step motion of the roll 10. It should be noted that the platen 20 as depicted is of circular cross section; its circle having its center in common with that of roll 10 at the central axis of the axle 12. By this means, when the platen 20 is moved toward the shell 14 of the roll 10 to a point where the end 28 of the compression surface of the platen 20 is substantially the same distance from the shell 14 as is the end 22 of the platen compression surface at which the pintle 24 is located, the compression surface of the platen 20 and the arcuate forming base formed by the corresponding portion of the shell 14 will be substantially in parallel (albeit curved) planar relationship to each other.

Figures 2, 3, 4:
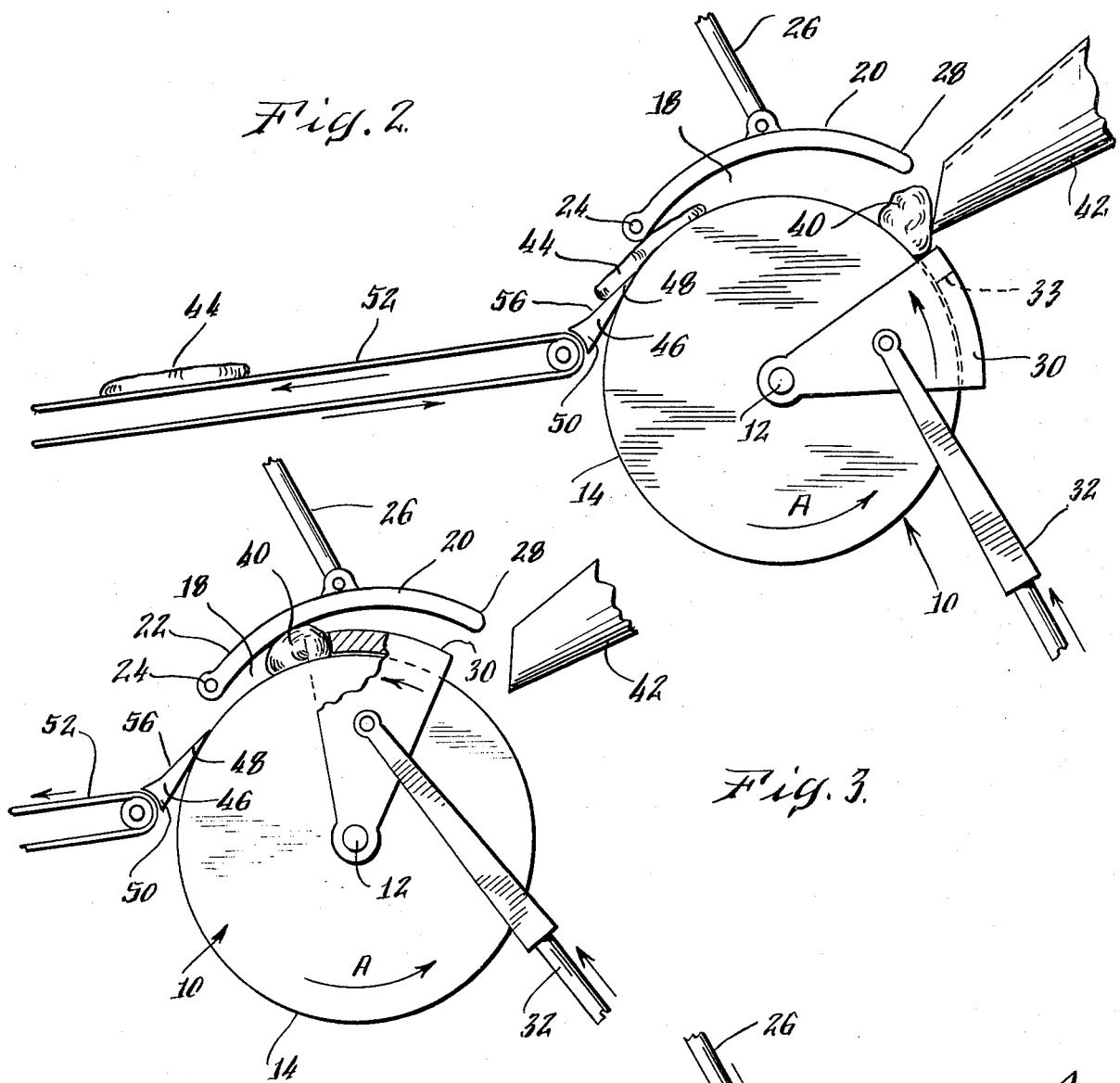

Also associated with the apparatus as depicted, is a moving means for moving masses of material to be processed into the region 18, in the form of a feed plate 30 extending across the width of the roll and pivotable about the axis of the roll by being supported by the axle 12 and connected to a cam or other known per se actuation means (not shown) by means of a connecting rod 32. Through operation of the connecting rod 32, the feed plate 30 may be caused to move pivotally about the axle 12, over the outer surface of the shell 14 of the roll 10, so as to move mounds 40 of material to be compressed and processed, such as wheat flour dough for tortillas, away from the discharge end of a feed ramp 42 into the region 18, as shown in FIG. 2. Alternatively, mounds may be manually fed into the machine.

Also associated with the apparatus is a scraper blade 46, one end 48 of which is in touching contact or close proximity to the outer surface of the shell 14, and the other end 50 of which is positioned next to the receiving end of a conveyor 52 to carry processed material away from the apparatus. It should be noted that the outer surface 56 of the scraper 46 is substantially tangential to the arcuate cross-sectional configuration of the outer shell 14. This arrangement is beneficial in that it tends to keep finished product coming off the apparatus from being bent or otherwise distorted objectionably.

In operation, the apparatus works as follows. Referring first to FIG. 2, a ball of dough 40 has come down the feed ramp 42 and rest on the outer surface of the shell 14. It has been found desirable to keep the diameter of the roll 10 relatively small, as this facilitates making the outer surface 56 of the scraper 46 as nearly as possible tangential to the arcuate outer surface of the shell 14, to facilitate damage-free removal of work product coming off the apparatus, as noted above. This, however, enhances the tendency of the ball of dough 40 to roll downward and/or not to be carried up and over the top of the roll 10 as the roll turns, which it starts to do, in the direction indicated by the arrow "A". To facilitate moving the ball of dough 40 over the top of the roll 10 and into the region 18, the feed plate 30, actuated by a cam (not shown) and the connecting rod 32 moves in the direction in which the roll is turning, more or less at the same speed, to push the dough ball 40 to the top of the roll 10 where, by operation of gravity and/or the turning roll, the ball of dough 40 moves into the space 18 until it comes into contact with the lower surface of the platen 20 as shown in FIG. 3. At this point the roll 10 stops turning, and the connecting rod 32 pulls the feed plate 30 back in the direction that is the reverse of its previous path of travel, so that it is out of the way when the connecting rod 26 is actuated to cause the platen 20 to swing downward pivotally about the pintle pin 24 until the lower surface of the platen 20 is in parallel planar relationship with the outer arcuate surface of the shell 14, causing the dough to be flattened into a tortilla of substantially uniform thickness which, experience has shown, will be more or less circular in configuration. In this posture, the step motion being in the stop phase for a predetermined, desired period, the tortilla will heat or cook at least in part at the outer surfaces, rendering it substantially stable in form and in a condition which has been found to be desirable for further processing and use. The latter sequence is illustrated in FIG. 4.

Although not intending hereby to be bound by these exact parameters, since persons skilled in the cognizant arts will, by knowledge and/or experimentation, be able to implement variations within the teachings of this invention, to attain desired results, the following machine parameters have been found to produce acceptable products eg. 8 in. tortillas:

Feed rate: 30-31 units per minute per row
Platen temperature: 350°-400° F. (177°-205° C.)
Dwell time in "stop" phase: $\frac{3}{8}$ sec. ±
Drum diameter: 20" (51 cm.) ±
Platen width: 24" (61 cm.) ±
Platen arc distance; 11"-12" (28-30 cm.) ±

Following the compression operation described above, the sequence heretofore described in connection with FIG. 2 is initiated with the connecting rod 26 pulling the platen 20 away from the roll 10, and the roll 10 beginning to rotate in direction "A", discharging the processed tortilla 44 onto the conveyor 52 by the tortilla having been lifted off the outer surface of the shell 14 through cooperative interaction of the end 48 of the scraper 46 and the turning roll 10. This sequence is illustrated at the lefthand side of FIG. 2, showing that as one process sequence ends, another is simultaneously beginning.

As noted above, it has been found desirable to keep the diameter of the roll 10 relatively small. However, it must also be kept in mind that three operations are anticipated to take place substantially over a large portion of the top half of the rolls represented by the diameter of the tortillas and/or dough balls plus a safe margin between each, because the masses of material are retained on the mechanism primarily by gravity. Thus, the final position of a formed tortilla is horizontal (i.e., on the oven, which is not shown), the "squeeze" position is just beyond top dead-center, and there must be enough incline from the "squeeze" position to the scraper to allow the tortilla to fall by sliding in response to gravity onto the exit conveyor.

It should also be noted that the person skilled in the arts will find it easy to adapt the teachings herein set forth to desired product objectives. Thus, it is known that there is a market for 10" diameter tortillas. Assuming a 25% spacing factor, and a 180° occupancy, this would indicate a desired drum diameter of $10'' + 25\% \times 6 = 75 \div \pi = 23.8''$. For a double row of tortillas, processed simultaneously, the drum width would be $(2 \times 10'') + 3 \times (10'' + 25\%) = 20'' \times 7.5'' = 27.5''$.

Further, optimally, the platen radius will be the drum radius plus the tortilla thickness, and the dwell time in the cooking phase will be as long as possible within a given cycle time, since a longer dwell time means a greater opportunity for heat transfer, requiring lower drum and platen temperatures. For certain applications this may be particularly significant as it is known to control the heat so as to cause tortillas to release readily from a heating surface without burning.

It will be apparent from the foregoing that a plurality of rows of tortillas may be fed simultaneously through devices made in accordance with the present invention and that rows, or combinations of rows, of large and small tortillas may be fed through the same machines. In any case, mechanisms embodying the present invention incorporate the advantages of moving heating surfaces, which avoid the difficulties of pushing out of the squeezing mechanisms as contemplated in prior art mechanisms.

Thus, it is to be understood that the embodiments herein illustrated and discussed are by way of illustration and not of limitation, and that other embodiments may be made without departing from the spirit or scope of this invention.

I claim:

1. Apparatus for processing foodstuff material comprising
   a drum which has a heatable arcuate outer surface and is rotatable in a desired direction about the axis of said outer surface,
   an associated compression plate having a heatable arcuate surface which is configured so as to be substantially equidistant throughout to the opposing portion of said outer surface of said drum when said surfaces are juxtaposed spaced apart at a distance desired for processing foodstuff material therebetween,
   said plate being moveable with respect to said drum into said juxtaposed, spaced-apart relationship, and out of said relationship with the end of said plate which the advancing drum surface first passes under when said drum rotates in a desired direction being moveable away from said drum while the other end of said plate remains pivotally fixed in substantially the same spaced-apart position with respect to said drum,
   motion means for rotating said drum in said desired direction,
   and means for moving said plate into said juxtaposed spaced-apart relationship and out of said relationship.

2. The apparatus described in claim 1 wherein said outer surface of said drum is cylindrical and said surface of said plate describes an arc of a circle.

3. The apparatus described in claim 1 including means for heating said surface of said drum, and means for heating said surface on said compression plate.

4. The apparatus described in claim 2 including means for heating said surface of said drum, and means for heating said surface on said compression plate.

5. The apparatus described in claim 3 comprising means for moving said drum in step motion.

6. The apparatus described in claim 4 comprising means for moving said drum in step motion.

7. The apparatus described in claim 5 including means for moving said compression plate into said juxtaposed spaced-apart relationship when said drum is in the stop phase of said step motion, and for moving said compression plate out of said relationship by one of its ends being so moved when said drum is in a phase of step motion other than said stop phase.

8. The apparatus described in claim 6 including means for moving said compression plate into said juxtaposed spaced-apart relationship when said drum is in the stop phase of said step motion, and for moving said compression plate out of said relationship by one of its ends being so moved when said drum is in a phase of step motion other than said stop phase.

9. The apparatus described in claim 7 including feed means for inserting masses of foodstuff material into the region between said plate and said surface of said drum at the side of said drum from which said drum moves, and scraper means for removing compressed foodstuff material from said drum at the side thereof toward which said drum moves.

10. The apparatus described in claim 8 including feed means for inserting masses of foodstuff material into the region between said plate and said surface of said drum at the side of said drum from which said drum moves, and scraper means for removing compressed foodstuff material from said drum at the side thereof toward which said drum moves.

* * * * *